United States Patent [19]

Numazawa et al.

[11] 4,359,910
[45] Nov. 23, 1982

[54] SHIFT MECHANISM FOR POWER TRANSMISSIONS

[75] Inventors: Akio Numazawa, Nagoya; Hideaki Koga, Toyota; Satomi Suzuki, Nagoya, all of Japan

[73] Assignees: Toyota Jidosha Kogyo Kabushiki Kaisha; Aisin Seiki Kabushiki Kaisha, both of Aichi, Japan

[21] Appl. No.: 177,233

[22] Filed: Aug. 11, 1980

[30] Foreign Application Priority Data

Aug. 9, 1979 [JP] Japan .................................. 54-101542

[51] Int. Cl.³ ........................ F16H 57/06; G05G 5/10
[52] U.S. Cl. ............................................ 74/476; 74/477
[58] Field of Search .................................. 74/476, 477

[56] References Cited

U.S. PATENT DOCUMENTS 3,043,413  7/1962  McAfee et al. ................... 74/476 X
3,866,488  2/1975  Nakata et al. ..................... 74/476 X
3,937,100  2/1976  Huffman ............................. 74/476

Primary Examiner—Allan D. Herrmann
Attorney, Agent, or Firm—Oblon, Fisher, Spivak, McClelland & Maier

[57] ABSTRACT

In a shift mechanism for a change-speed gearing in a power transmission unit, a spring loaded movable element in the form of a piston is slidably disposed within a reverse shift head member to be pushed inwardly by engagement with a shift-and-select lever, and a stopper pin is integral with the movable element and movable between a first position in which the movable element is apart from the lever and a second position in which the movable element is engaged with the lever, the stopper pin being arranged to be located at its outer end adjacent to a stationary member to restrict unexpected forward movement of a reverse fork shaft in its first position and to be aligned with a recessed portion of the stationary member to permit the forward movement of the reverse fork shaft in its second position for establishment of a reverse gear train.

5 Claims, 4 Drawing Figures

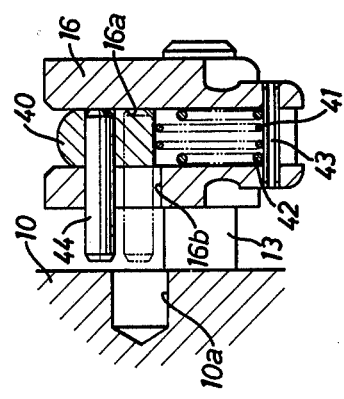
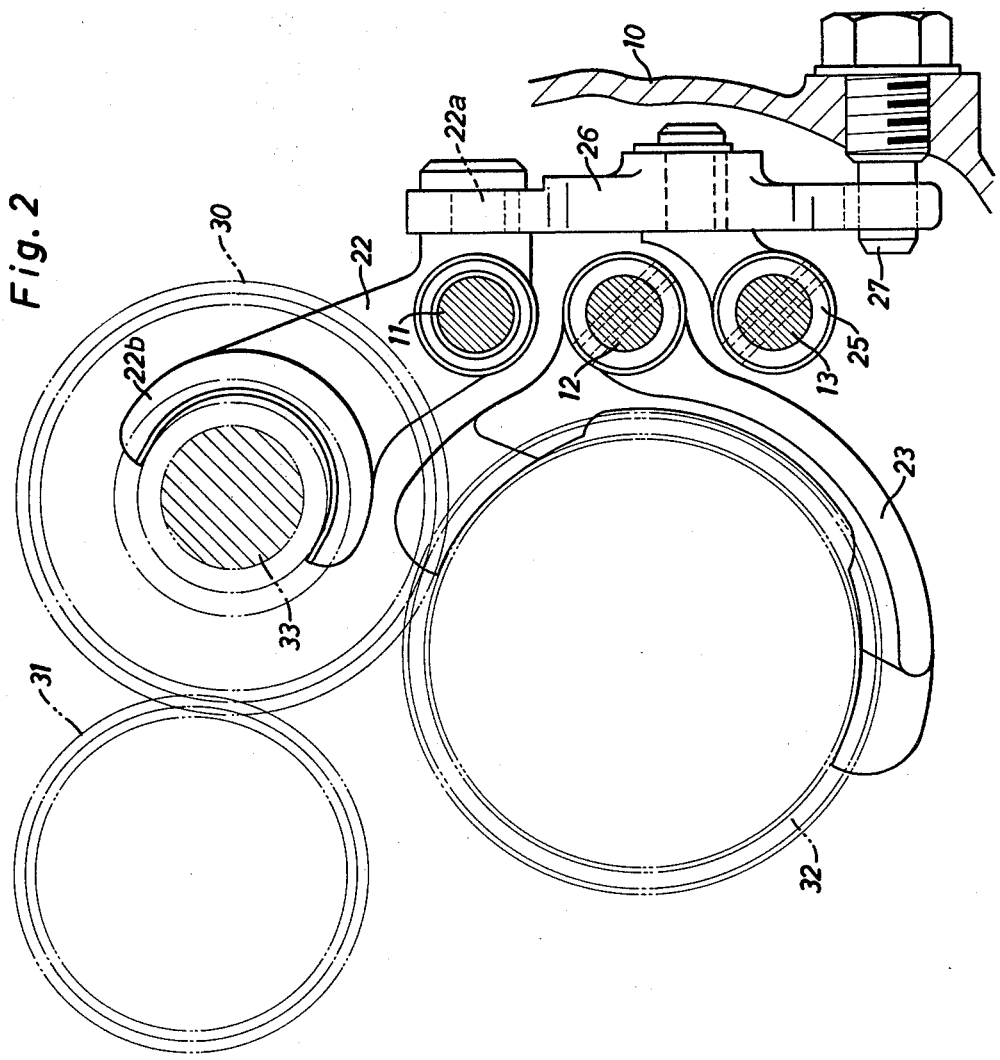

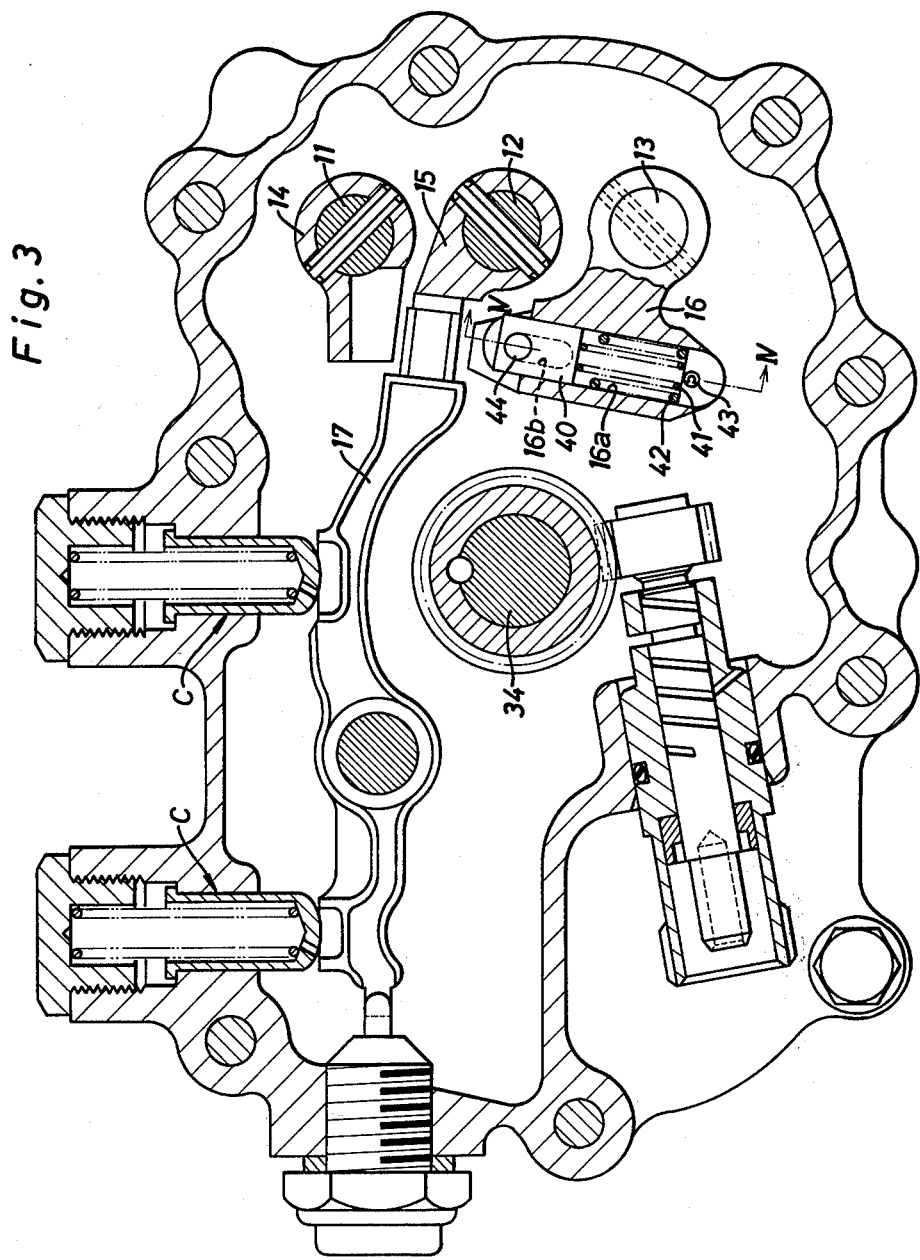

SHIFT MECHANISM FOR POWER TRANSMISSIONS

BACKGROUND OF THE INVENTION

1. Field of the Invention

The present invention relates to a power transmission unit for automotive vehicles, and more particularly to a shift mechanism for a change-speed gearing in a power transmission unit which includes a plurality of fork shafts slidably supported from the transmission casing of the unit through a shift restriction mechanism in such a manner that any one of the fork shafts is selectively shifted by a shift-and-select lever along the fore-and-aft axis of the vehicle while the remaining fork shafts are locked in their neutral positions.

2. Description of the Prior Art

In a conventional shift mechanism a reverse shift fork member is operatively connected to a reverse fork shaft selected from the fork shafts, the reverse shift fork member being arranged to shift a reverse idler gear toward and away from reverse drive and output gears for establishing a reverse gear train, a shift head member is fixed to a rearwardly extended portion of the reverse fork shaft, and the shift-and-select lever is arranged to be engaged with the shift head member in its selecting operation and to shift the reverse fork shaft in the forward direction so as to establish the reverse gear train. In use of the shift mechanism, if a forward inertia force acts on the fork shafts in an occurrence of collision of the vehicle with the shift-and-select lever in its neutral position, the reverse fork shaft is displaced in the forward direction due to additional forward inertia forces acting on the reverse idler gear and the reverse shift fork member. As a result of the forward displacement of the reverse fork shaft, the reverse gear train is unexpectedly established, and the shift restriction mechanism acts to lock the remaining fork shafts in their neutral positions. This means that even if the collision occurs at a relatively low speed without any obstruction to re-travel of the vehicle, it is unable to conduct the shifting operation of the shift-and-select lever for re-travel of the vehicle.

SUMMARY OF THE INVENTION

It is, therefore, the primary object of the present invention to provide an improved shift mechanism for a change-speed gearing capable of restricting unexpected forward displacement of the reverse fork shaft in such an occurrence of vehicle collision as mentioned above.

According to the present invention briefly summarized, there is provided a shift mechanism for a change-speed gearing in a power transmission unit of an automotive vehicle which includes a plurality of fork shafts slidably supported from the transmission casing of the unit through a shift restriction mechanism in such a manner that any one of the fork shafts is selectively shifted by a shift-and-select lever along the fore-and-aft axis of the vehicle while the remaining fork shafts are locked in their neutral positions, a reverse shift fork member operatively connected to a reverse fork shaft selected from the fork shafts, the reverse shift fork member being arranged to shift a reverse idler gear toward and away from reverse drive and output gears for establishing a reverse gear train, and a shift head member fixed to a rearwardly extended portion of the reverse fork shaft, the shift-and-select lever being arranged to be engaged with the shift head member in its selecting operation and to shift the reverse fork shaft in the forward direction so as to establish the reverse gear train. The shift mechanism further includes a spring loaded movable element slidable within the shift head member to be pushed inwardly by engagement with the shift-and-select lever, and a stopper pin integral with the movable element and movable between a first position in which the movable element is apart from the lever and a second position in which the movable element is engaged with the lever, the stopper pin being arranged to face at its outer end to a stationary member to restrict forward movement of the reverse fork shaft in its first position and to be aligned with a recessed portion of the stationary member to permit the forward movement of the reverse fork shaft in its second position. It is preferable that the stopper pin is arranged to be located at its outer end adjacent to an upright inner wall of the transmission casing in its first position and to be aligned with a counter-bore formed in the upright inner wall in its second position.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views and wherein:

FIG. 2 is a rear view of a reverse gear train assembled within the power transmission unit, taken along the plane of line II—II in FIG. 1;

FIG. 3 is a rear view of the shift mechanism taken along the plane of line III—III in FIG. 1; and FIG. 4 is a sectional view taken along the plane of line IV—IV in FIG. 3.

DETAILED DESCRIPTION OF THE PREFERRED EMBODIMENT

Figure 1:
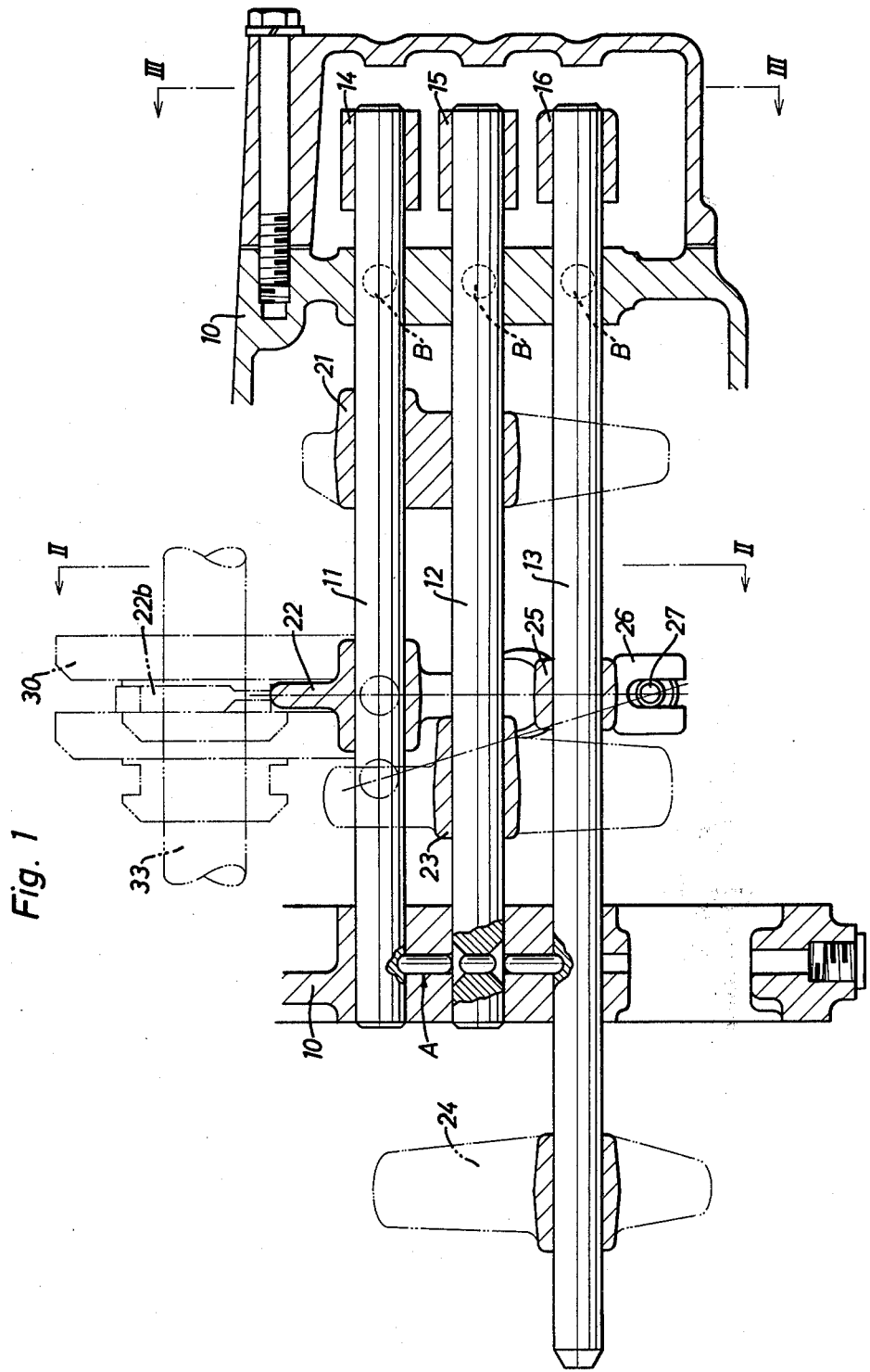
FIG. 1 is a side view, in partial section, of a shift mechanism for a change-speed gearing in a power transmission unit in accordance with the present invention.

In FIGS. 1 to 4 of the drawings, there is illustrated a shift mechanism for a change-speed gearing of a power transmission unit in which constant-mesh gears are arranged to provide five forward ratios, of which the uppermost ratio is a direct-drive ratio, and a sliding-mesh reverse gear train is arranged to give a single reverse ratio. The shift mechanism includes three parallel fork shafts 11, 12 and 13 which are slidably supported from a transmission casing 10 through a shift restriction mechanism A and a positioning mechanism B carried on casing 10 to be shifted along the fore-and-aft axis of the vehicle. Fork shafts 11, 12 and 13 are integrally provided at their rearwardly extended portions with shift head members 14, 15 and 16 respectively with which a shift-and-select lever 17 is selectively engaged, as shown in FIG. 3. Shift-and-select lever 17 is arranged to be manipulated by the operator, and it is brought into engagement with the middle shift head member 15 by means of a conventional select-return mechanism C in its neutral position. Shift-and-select lever 17 is mounted in casing 10 for both rotary and axial movement and is selectively engaged with any one of the shift head members 14, 15 and 16 in its selecting operation and acts to shift the engaged shift head member in the fore-and-aft direction in its shifting operation.

As can be well seen in FIG. 1, the upper fork shaft 11 carries a 1-2 shift fork member 21 fixedly thereon and carries a reverse shift fork member 22 slidably thereon. In operation, to establish the first forward ratio, the upper fork shaft 11 is shifted rearwardly (rightwardly in FIG. 1) by the shift-and-select lever 17 through shift head member 14 to move the 1-2 shift fork member 21 in the same direction. To establish the second forward ratio, the upper fork shaft 11 is shifted forwards (leftwardly in FIG. 1) by the shift-and-select lever 17 to move the 1-2 shift fork member in the same direction. The middle fork shaft 12 carries a 3-4 shift fork member 23 fixedly thereon and carries the 1-2 shift fork member slidably thereon. To establish the third forward ratio, the middle fork shaft 12 is shifted rearwardly (rightwardly in FIG. 1) by the shift-and-select lever 17 through shift head member 15 to move the 3-4 shift fork member 23 in the same direction. To establish the fourth forward ratio, the middle fork shaft 12 is shifted forwards (leftwardly in FIG. 1) by the shift-and-select lever 17 to move the 3-4 shift fork member 23 in the same direction. Lower fork shaft 13 is relatively longer and heavier than each of fork shafts 11, 12, and carries a shift fork member 24 and a reverse shift head member 25 fixedly thereon. When the lower fork shaft 13 is shifted rearwardly (rightwardly in FIG. 1) by the shift-and-select lever 17 through shift head member 16, the shift fork member 24 is moved rearwardly to establish the direct-drive ratio.

As can be well seen in FIG. 2, a reverse shift arm member 26 is rotatably supported at its intermediate portion by the reverse shift head member 25 and pivoted at its lower end on a lateral pin 27 fixed to transmission casing 10 to be swung along the fork shafts 11, 12 and 13 in response to axial movement of the reverse shift head member 25. Reverse shift fork member 22 is supported at its lateral pin 22a by the upper end of shift arm member 26 and receives on its claw portion 22b a reverse idler gear 30 which is axially slidable on a reverse idler shaft 33. Reverse idler gear 30 is rotatable on the reverse idler shaft 33 and is arranged to be shifted toward and away from a reverse drive gear 31 and a reverse output gear 32 by means of the reverse shift fork member 22. Reverse drive gear 31 is rotatably supported from transmission casing 10 and drivingly connected to an output shaft of a vehicle engine by way of a frictional engagement mechanism (not shown) of the transmission unit. Reverse output gear 32 is integrally formed with a synchronizer on an output mainshaft 34 of the transmission unit and is arranged to be positioned in a common vertical plane with the reverse drive gear 31 when the synchronizer is in its neutral position. Mainshaft 34 is rotatably supported from the transmission casing 10 and is drivingly connected to drive wheel axles by way of a final drive gearing (not shown). In this embodiment, when the lower fork shaft 13 is shifted forwards (leftwardly in FIG. 1) by the shift-and-select lever 17 through shift head member 16, the reverse shift head member 25 is moved in the same direction to swing the reverse shift arm member 26 in the counter-clockwise direction. Then, the reverse shift fork member 22 is linearly slid along the upper fork shaft 11 to mesh the reverse idler gear 30 with the reverse drive and output gears 31 and 32 so as to establish the reverse gear train.

As can be well seen in FIGS. 3 and 4, the shift head member 16 of lower fork shaft 13 is formed with an inner bore 16a in which a movable element in the form of a piston 40 is assembled together with compression coil springs 41 and 42. Piston 40 acts as a restriction pin in a conventional reverse restrict mechanism which projects outwardly from inner bore 16a in a predetermined distance. Piston 40 is arranged to be pushed inwardly by engagement with the shift-and-select lever 17. Coil spring 41 is in the form of a weak return spring of a small diameter which is supported at its lower end by a lateral pin 43 fixed to shift head member 16 and is engaged at its upper end with the bottom of piston 40 to bias the piston 40 outwardly. Coil spring 42 is in the form of a strong spring of a large diameter which is compressed by piston 40 after the spring 41 is compressed in a predetermined distance. When the shift-and-select lever 17 is brought into engagement with the shift head member 16 without engagement with piston 40 in its selecting operation, the reverse restrict mechanism acts to permit the rearward shifting movement of lever 17 for establishment of the direct-drive ratio and to prevent the forward shifting operation of lever 17 due to engagement with both the shift head members 15 and 16. This serves to avoid erroneous operation of lever 17 in the forward direction.

In this embodiment, it is to be noted that a stopper pin 44 is transversely wedged into piston 40 and extends outwardly through an elongated slot 16b formed in shift head member 16. Thus, the outer end of stopper pin 44 is arranged to be located adjacent the upright inner wall of casing 10. Under disengagement of the shift-and-select lever 17 from piston 40, the stopper pin 44 abuts against the upper end of elongated slot 16b to hold the piston 40 in place and faces the upright inner wall of casing 10 to restrict forward movement of the shift head member 16. When the piston 40 is pushed into inner bore 16a by engagement with the shift-and-select lever 17 in selecting operation toward the shift head member 16, the stopper pin 44 is moved down along elongated slot 16b to be aligned with a counter-bore 10a. The counter-bore 10a is formed in the upright inner wall of casing 10 with an appropriate depth to permit the forward movement of stopper pin 44 for establishment of the reverse gear train.

Upon occurrence of a collision of the vehicle with the shift-and-select lever 17 in its neutral position, a forward inertia force acts on the respective fork shafts 11, 12 and 13. In this instance, if the collision occurs at a relatively low speed (approximately 5 miles/h) without any obstruction to re-travel of the vehicle, the forward displacement of fork shafts 11 and 12 can be restricted by the positioning mechanism B because of relatively small inertia forces acting on the fork shafts 11 and 12. Meanwhile, the forward inertia force acting on lower fork shaft 13 is large because of the heavy weight of the fork shaft 13 and additional inertia forces acting on the reverse idler gear 30 and the shift fork member 22. As a result, the forward movement of fork shaft 13 may not be restricted by the positioning mechanism B, but it is reliably restricted by abutment of the stopper pin 44 against the upright inner wall of casing 10. In addition, the displaced fork shaft 13 is returned to its original position by the positioning mechanism B. Thus, it is able to conduct the shifting operation of lever 17 after the vehicle collision, and re-travel of the vehicle is possible. In selecting operation of the shift-and-select lever 17 for establishment of the reverse gear train, the piston 40 is pushed down by engagement with lever 17 so that the stopper pin 44 is aligned with the counter-bore 10a. Subsequently, in shifting operation of lever 17, the stopper pin 44 is inserted into the counter-bore 10a, and the shift head member 16 is moved forwards to establish the reverse gear train.

Although a certain specific embodiment of the present invention has been shown and described, it is obvious that many modifications and variations thereof are possible in light of these teachings. For instance, the present invention may be adpated to a shift mechanism for such various transmissions as a transmission of the type for providing four forward ratios and a single reverse ratio, which shift mechanism includes a fork shaft slidably supported from a transmission casing by means of a shift restriction mechanism to be shifted along the fore-and-aft axis of the vehicle, a reverse shift fork member operatively connected to the fork shaft for moving a reverse idler gear toward and away from reverse drive and output gears, a shift head member fixed to a rearwardly extended portion of the fork shaft, and a shift-and-select lever mounted in the transmission casing for rotary and axial movement and arranged to be engaged with the shift head member in its selecting operation. It is to be understood therefore that within the scope of the appended claims, the invention may be practiced otherwise than a specifically described herein.

What is claimed is:

1. In a shift mechanism for a change-speed gearing in a power transmission unit of an automotive vehicle, including a plurality of fork shafts slidably supported from the transmission casing of said unit through a shift restriction mechanism in such a manner that any one of said fork shafts is selectively shifted by a shift-and-select lever along the fore-and-aft axis of the vehicle while the remaining fork shafts are locked in their neutral positions; a reverse shift fork member operatively connected to a first fork shaft selected from said fork shafts, said reverse shift fork member being arranged to shift a reverse idler gear toward and away from reverse drive and output gears for establishing a reverse gear train; and a shift head member fixed to a rearwardly extended portion of said first fork shaft, said shift-and-select lever being arranged to be engaged with said shift head member in its selecting operation and to shift said first fork shaft in the forward direction so as to establish the reverse gear train;

the improvement comprising:
a spring loaded movable element slidable within said shift head member to be pushed inwardly by engagement with said shift-and-select lever; and
a stopper pin integral with said movable element and movable between a first position in which said movable element is apart from said lever and a second position in which said movable element is engaged with said lever, said stopper pin being arranged to face at its outer end to a stationary member in its first position so as to restrict forward movement of said first fork shaft and to be aligned with a recessed portion of said stationary member to permit the forward movement of said first fork shaft.

2. A shift mechanism as claimed in claim 1, wherein said stopper pin is arranged to be located at its outer end adjacent to an upright inner wall of said transmission casing in its first position and to be aligned with a counter-bore formed in said upright inner wall in its second position.

3. A shift mechanism as claimed in claim 1, wherein said shift head member is formed with an inner bore opening toward a free end of said shift-and-select lever and an elongated slot located at one side of said inner bore, and wherein said movable element is in the form of a piston slidable within said inner bore of said shift head member, said piston being loaded outwardly by a spring assembled within said inner bore, and said stopper pin is fixed to said piston and extends through said elongated slot to be located at its outer end adjacent to an upright inner wall of said transmission casing in its first position and to be aligned with a counter-bore formed in said upright inner wall in its second position.

4. A shift mechanism for a change-speed gearing in a power transmission unit, comprising a first fork shaft for conducting a first and second shift operation of said gearing, a second fork shaft for conducting a third and fourth shift operation of said gearing, and a third fork shaft for conducting reverse shift operation of said gearing in its forward movement, said fork shafts being arranged in parallel with a reverse idler shaft and an output mainshaft of said change-speed gearing and being slidably supported from the transmission casing of said unit through a shift restriction mechanism in such a manner that any one of said fork shafts is selectively shifted by a shift-and-select lever along the fore-and-aft axis of the vehicle while the remaining fork shafts are locked in their neutral positions, said shift mechanism comprising:
a reverse drive gear and a reverse output gear on said output mainshaft;
a first shift head member fixed to said third fork shaft;
a second shift head member fixed to a rearwardly extended portion of said third fork shaft;
a shift arm member rotatably supported by said first shift head member at its intermediate portion and pivoted at its one end on a projection of the transmission casing to be swung along said fork shafts in response to axial movement of said third fork shaft;
a shift fork member slidably mounted on said first fork shaft and being supported by the other end of said shift arm member and receiving thereon a reverse idler gear axially slidable on said reverse idler shaft to shift it toward and away from said reverse drive and output gears;
a spring loaded movable element slidable within said second shift head member to be pushed inwardly by engagement with said shift-and-select lever; and
a stopper pin integral with said movable element and movable between a first position in which said movable element is apart from said lever and a second position in which said movable element is engaged with said lever, said stopper pin being arranged to face at its outer end to a stationary member in its first position so as to restrict forward movement of said third fork shaft and to be aligned with a recessed portion of said stationary member to permit the forward movement of said third fork shaft.

5. A shift mechanism as claimed in claim 4, wherein said third fork shaft is arranged to conduct a fifth shift operation of said change-speed gearing in its rearward movement.

* * * * *